Sept. 28, 1965   M. A. CHAVANNES ETAL   3,208,898
APPARATUS FOR EMBOSSING AND LAMINATING MATERIALS
Filed March 9, 1960   4 Sheets-Sheet 1
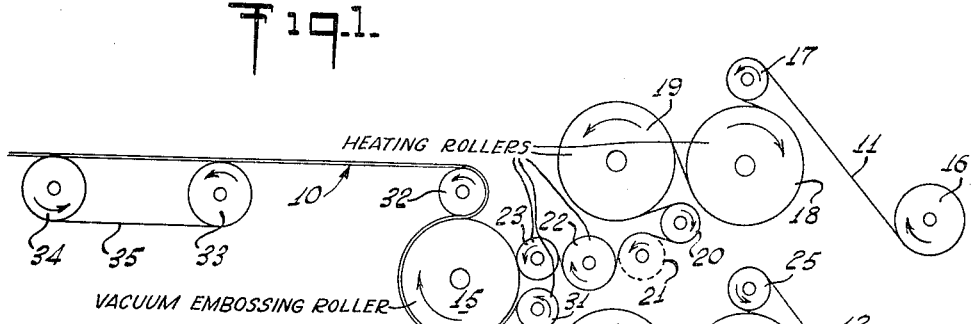
Fig.1.
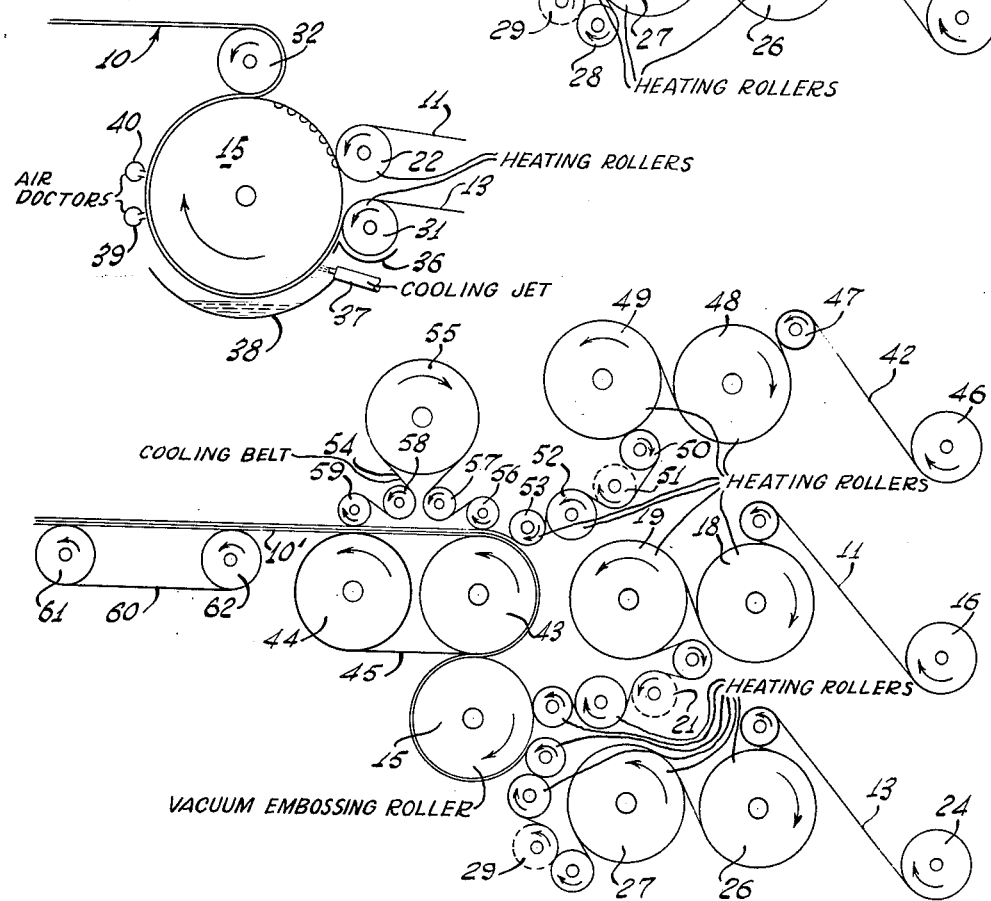
Fig.2.
Fig.3.
INVENTORS
MARC A. CHAVANNES
ALFRED W. FIELDING
BY
ATTORNEY

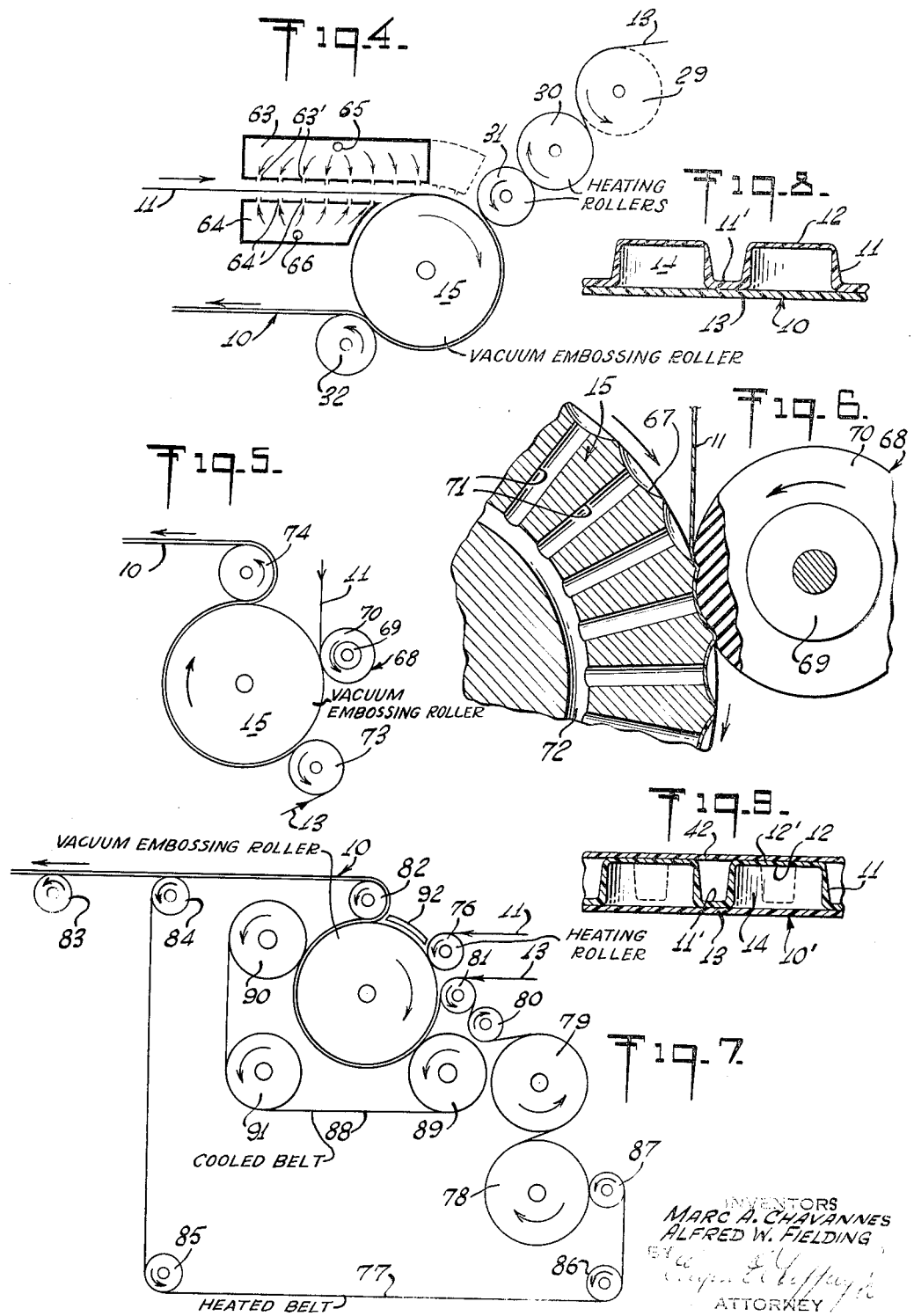

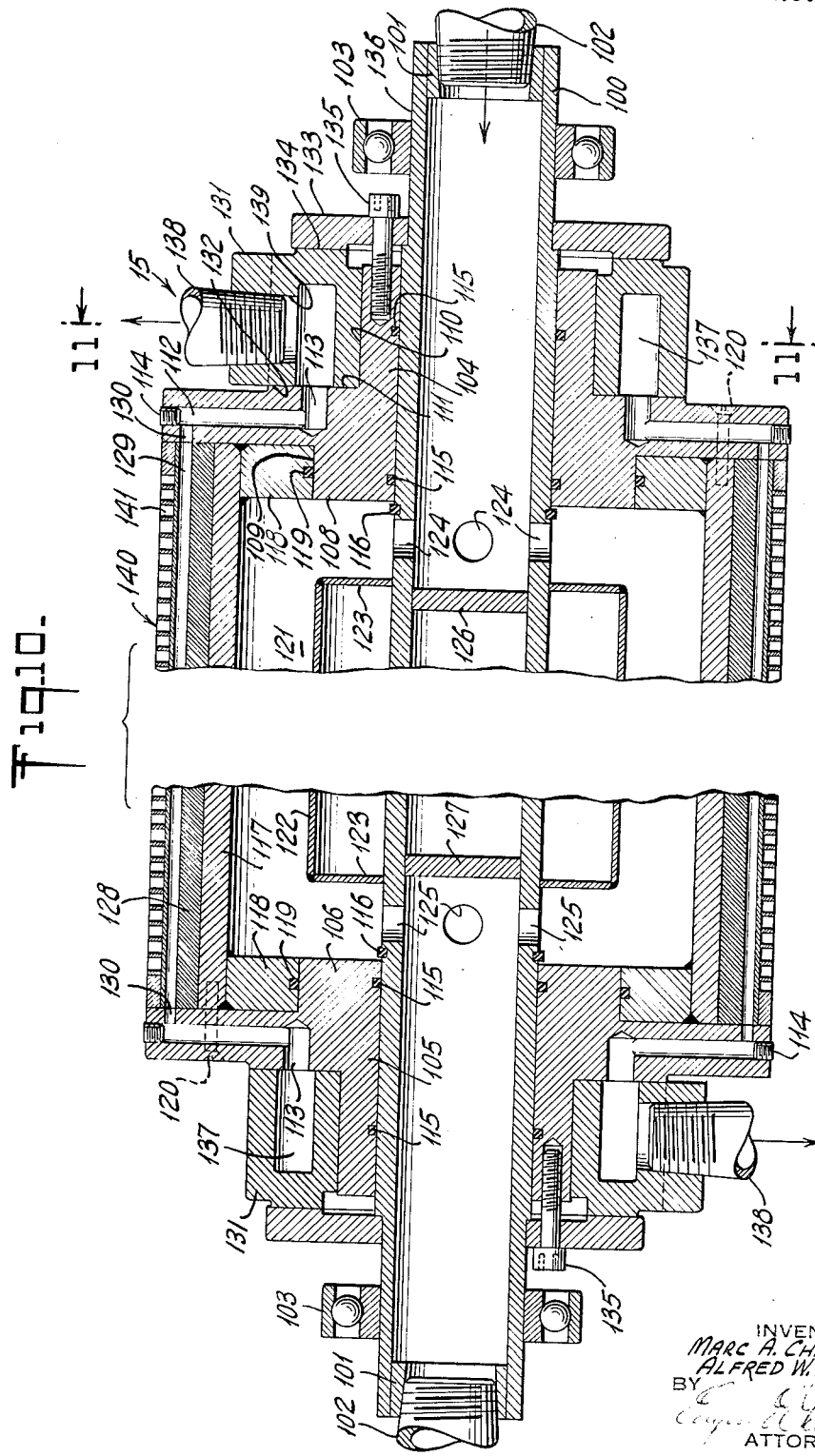

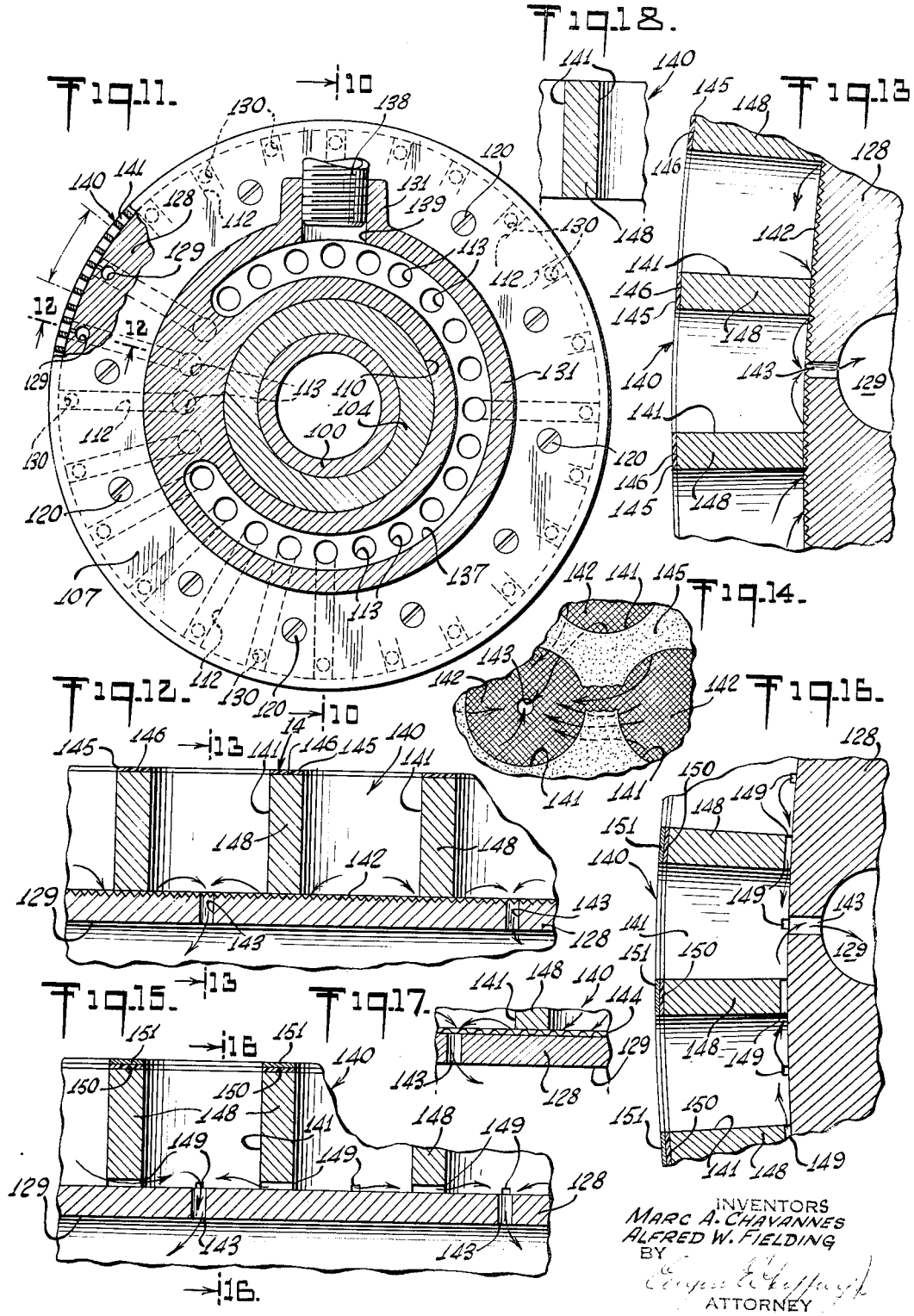

United States Patent Office 3,208,898
Patented Sept. 28, 1965

3,208,898
APPARATUS FOR EMBOSSING AND LAMINATING MATERIALS
Marc A. Chavannes, Brooklyn, N.Y., and Alfred W. Fielding, Wayne, N.J., assignors to Sealed Air Corporation, Hawthorne, N.J.
Filed Mar. 9, 1960, Ser. No. 13,937
6 Claims. (Cl. 156—498)

This invention relates to the embossing and laminating of materials and more specifically to a novel and improved apparatus for embossing plastics and for laminating such embossed materials with other sheet plastic materials.

The method and apparatus in accordance with the invention, while being generally useful, is particularly applicable for use in the fabrication of cushioning material wherein air or other gas is entrapped between laminated layers of plastic sheets. To this end, the invention contemplates an improved procedure and apparatus for handling the plastic materials being formed and laminated that enables the attainment of high operational speeds and at the same time prevents distortion of the plastic sheets prior to and during the forming operation.

Another object of the invention resides in the provision of a novel and improved method and apparatus which greatly facilitates embossing and laminating of plastic materials that is characterized by its relatively high operational speeds, dependability and reliability.

Another object of the invention resides in the provision of a novel and improved embossing roller arranged to cool selected portions of the embossed or molded film while the film is retained under a vacuum to hold its form during the cooling operation. By reason of an improved arrangement and coordination of elements, the improved roller not only facilitates the lamination of the selectively cooled and embossed film with other plastic sheets to seal the embossed portions, but also simplifies roller construction and facilitates modification of the molding surface on the roller.

Still another object of the invention resides in the provision of a novel and improved embossing or molding roller for embossing plastic materials.

A further object of the invention resides in a novel and improved pressure and vacuum system for embossing plastic materials.

A still further object of the invention resides in the provision of a novel and improved film handling and transporting means for feeding the film to the forming and laminating apparatus and which transporting means minimizes distortion of the film during the feeding operation.

A still further object of the invention resides in the novel and improved method and apparatus for laminating plastic materials as, for instance, the lamination of a plastic sheet to the salient portions of sealed cells extending from at least one surface of the composite structure.

The above and other objects of the invention will become more apparent from the following description and accompanying drawings forming part of this application.

In the drawings:

FIG. 1 is a diagrammatic view of one embodiment of laminating and embossing apparatus in accordance with the invention;

FIG. 2 is a diagrammatic view of a modified embodiment of the invention;

FIG. 3 is a diagrammatic view of still another embodiment of the invention wherein at least three plastic sheets or films are laminated to produce a cushioning material;

FIG. 4 is a diagrammatic view of still another embodiment of the invention showing improved film handling means;

FIG. 5 is a diagrammatic view of still another embodiment of the invention utilizing pressure and vacuum embossing;

FIG. 6 is an enlarged view of a fragmentary section of FIG. 5 to illustrate certain characteristics thereof;

FIG. 7 illustrates still another embodiment of the invention in diagrammatic form to provide improved film support during the embossing and laminating operations;

FIG. 8 is a cross sectional view of an embossed and laminated material fabricated in accordance with the invention;

FIG. 9 is a cross sectional view of an embossed and laminated material of the type that may be produced by the apparatus shown in FIG. 3;

FIG. 10 is a cross sectional view of an improved embossing or molding roller in accordance with the invention;

FIG. 11 is a cross sectional view of FIG. 10 taken along the line 11—11 thereof;

FIG. 12 is a cross sectional view of FIG. 11 taken along the line 12—12 thereof;

FIG. 13 is a cross sectional view of FIG. 12 taken along the line 13—13 thereof;

FIG. 14 is a view of FIG. 12 taken in the direction of the arrow 14;

FIG. 15 is a cross sectional view of the roller shown in FIGS. 10 and 11 and is along the lines of FIG. 12 but shows a modified arrangement for extracting air from the molding recesses formed in the surface of the roller to effect the embossing and molding process;

FIG. 16 is a cross sectional view of FIG. 15 taken along the lines 16—16 thereof;

FIG. 17 constitutes a fragmentary portion of FIG. 12 and illustrates a modified mode of extracting air from the molding recesses to effect the embossing or molding process; and FIG. 18 is a fragmentary section of FIG. 12 and illustrates still another form of the invention.

Referring now to the drawings and more specifically to FIG. 1, there is diagrammatically illustrated one form of the invention that is useful, among other things, for the fabrication of a product such as that illustrated in FIG. 8. It will be observed with reference to FIG. 8 that the product generally denoted by the numeral 10 comprises an embossed or molded plastic layer 11 having a plurality of closely spaced embossments 12 distributed throughout the area of the film 11 and a sealing layer 13 hermetically sealing the embossments 12 to provide a plurality of cells 14 distributed over the surface of the material.

The structure shown in FIG. 1 utilizes an improved embossing roller 15 in accordance with the invention. This roller is shown in detail in FIGS. 10 through 18 of the drawings and will be described in connection with those figures. The two sheets of plastic material 11 and 13 may be of any desired thickness, though films in the range of .001″ to .025″ are generally used. The actual thickness of the films selected for a specific product would of course be determined by the characteristics required of the resultant material 10.

More specifically, the plastic sheet or film 11 may be fed from a supply roller 16 or other supply source to a first roller 17 which preferably includes a rubber or rubber-like surface. The film, after passing about the roller 17 engages a pair of heating rollers 18 and 19. The rollers 18 and 19 are disposed relative to roller 17 so that the film 11 will contact a substantial part of their peripheries and thereby provide the maximum time for imparting heat to the film 11. Inasmuch as it has been found desirable to heat the film gradually, the roller 19 is maintained at a temperature above that of roller 18. The film then passes about an idler roller 20, an expanding roller 21 and heating rollers 22 and 23. The expanding roller is made up of a plurality of elements placed in edge-to-edge relationship to form a cylindrical structure. Alternate elements are interconnected and are arranged to be displaced laterally during rotation of the roller. The lateral displacement occurs only during the time the elements are in contact with the film 11 and are thereafter retracted so that when they again contact the film they will be moving laterally to effect expansion of the film. The roller 22 further heats the film 11 and the final heating roller is customarily at a temperature close to or above the melting point of the film so that the film is heated to the necessary level of temperature under its melting point at the time it is fed to the embossing roller 15. As will be described, the embossing roller 15 is vacuum operated and is provided with a plurality of depressions or embossments formed in the surface thereof for the purpose of forming the cells 12 (see FIG. 8) in the final article. The roller 15 is also water cooled in a manner that will effect cooling of the molded portions of the film and may be arranged to prevent cooling of unmolded portions of the film for the purpose of sealing the second plastic layer 13 thereto.

By way of an example of the temperatures of the heating rollers referred to above, when utilizing a low density polyethylene having a thickness of about .005" and a melting point of approximately 235° F., roller 18 may be heated to about 180° F., roller 19 to about 200° F., roller 22 to about 225° F. and roller 23 to about 260° F. As the film 11 is traveling at relatively high speed, the film temperature is in the vicinity of its melting point, though it is important that melting does not actually occur.

The second film 13 is fed from a suitable film source such as a roll of film 24, thence about a rubber surfaced roller 25, heating rollers 26 and 27, an idler roller 28, an expanding roller 29 and heating rollers 30 and 31. The rollers 26, 27 and 30 and 31 are heated to successively increasing temperatures so that the roller 31 will cause the film 13 to attain a temperature in the vicinity of its melting point. The roller 31 is also in pressure engagement with the roller 15 so that as the film 13 is applied to the molded film 11, the two films will fuse one to the other to permanently seal the embossed portions 12 and thus provide the sealed cells 14, as previously described. The sealing of the films one to the other occurs only at the unembossed areas 11' of the film 11, as may be observed more clearly in FIG. 8. It will also be observed that the film 13 is applied to the film 11 in close proximity to the point of application of the film 11 to the embossing roller 15 to minimize cooling of the salient portions of film 11 to which film 13 is fused. If desired, the heating means may be introduced between the rollers 23 and 31 to insure maintenance of the film parts 11' at the fusing temperature. After the fusion has been completed the film continues about the roller 15 so that it will be properly cooled before removal by a takeoff roller 32 and suitable transporting means such as the conveyor which includes rollers 33 and 34 and cooperating belt 35.

Under certain conditions it is desirable to provide for more rapid cooling of the film after lamination and thereby permit greatly increased speeds of operation. This can be attained by the embodiment of the invention shown in FIG. 2 which constitutes a fragmentary portion of FIG. 1 and in which corresponding elements of both figures are denoted by like numerals. In this figure a shield 36 is disposed beneath the roller 31 and in close proximity to the embossing roller 15. Water injection means 37 is disposed beneath the shield 36 and sprays a cooling stream of water or other coolant directly upon the surface of the laminated films 11 and 13. This effects rapid cooling and sealing of the films and prevents any possibility of separation of the films during their travel about the embossing roller 15. When liquid coolants are employed, a suitable trough 38 is disposed beneath the roller 15 to receive the sprayed liquid, whereupon it may be reprocessed through suitable cooling apparatus and associated pumps. The degree of cooling when utilizing a coolant may be controlled both by the temperature of the coolant, as well as the point on the roller at which the coolant is applied. When the laminated film is cooled by a liquid coolant it is dried by the pressure jets 39 and 40 in which dry air or other suitable gas is discharged against the laminated film under pressure. In this way, the jets 39 and 40 operate in the manner of doctor blades to remove or evaporate the liquid coolant from the surface of the film and effect complete drying of the film before being removed by the roller 32, as described in connection with FIG. 1.

While the films 11 and 13, which are molded and laminated as described in connection with FIGS. 1 and 2 may be of any suitable material, it is of course important that the films be of a material that will soften and melt with an increase in temperature. While films of this type are generally referred to as "thermoplastic," and such films are generally utilized with this invention, nevertheless, it is not intended that this invention be limited to the use of films classified generally in the trade as "thermoplastic" film, as any film capable of being molded and sealed by apparatus in accordance with the invention may be used.

For a more detailed description of the product fabricated in accordance with this invention, reference is made to a prior United States Letters Patent of Marc A. Chavannes, one of the co-inventors herein, No. 3,142,599, granted July 28, 1964, entitled "Method for Making Laminated Cushioning Material."

The apparatus illustrated in FIG. 3 affords a novel and improved mode of fabricating an article shown in cross section in FIG. 9. This article corresponds to the article shown in FIG. 8, and corresponding elements of these figures are denoted by like numerals, except that the article of FIG. 9 is generally denoted by the numeral 10'. It will be observed, however, that the article shown in FIG. 9 includes a plastic layer or film 42 which is heat sealed to the upper surfaces 12' of the embossments 12. The heat sealing of the layer 42 to the embossments 12 may be effectively and dependably accomplished by the structure generally shown in FIG. 3. In this figure that portion of the apparatus utilized for the handling and heating of the films 11 and 13 and the embossing and laminating of these films is substantially identical to the structure shown in FIG. 1, and accordingly corresponding elements are denoted by like numerals. When the two films 11 and 13 have been molded and laminated as previously described, the resultant product which now corresponds essentially to that shown in FIG. 8 is removed from the roller 15 by a pair of rollers 43 and 44 carrying a surrounding belt 45. This belt 45 may be of any suitable material, as for instance, stainless steel, fabric or the like, and should be sufficiently taut to firmly support the laminated film. This laminated film, upon leaving the roller for transport about the roller 43 by the belt 45, has now been cooled and each of the individual cells 14 hermetically sealed preparatory to the application of the overlying film 42.

The film 42 may be obtained from any suitable source of supply as, for instance, a roll of film 46 and it is fed about a series of rollers 47 through 53. The rollers 48 and 49 are heating rollers for successively increasing the temperature of the film 42. The film then passes over an idling roller 50, and an expanding roller 51, the latter corresponding to the expanding rollers 21 and 29, previously described. The film is then carried over heating rollers 52 and 53 to raise the temperature of the film 42 to a fusing temperature. The roller 53 is in pressure engagement with the laminated structure leaving the embossing and laminating roller 15 and functions to urge the heated film 42 tightly against the outer or salient portion of the sealed cells 14.

It will be observed at this point of the process that while the hermetically sealed cells 14 have been cooled, a heat seal can be effectively attained, since it has been found that sufficient heat will be transferred from the film 42 to the surface layers of the cells 14 which are contacted by film 42 and thereby effect a joinder of the meeting surfaces. This apparently results from the fact that the plastic film utilized in the formation of the cells 14 is a relatively poor heat conductor so that when the film 42, which has a temperature at about its melting point is applied, a firm joinder will result. Furthermore, inasmuch as the cells 14 are hermetically sealed, substantial pressure can be applied to urge the film 42 into contact with the cells 14 without damaging them in any way.

After the film 42 is joined to and overlies the cells 14, the resultant triple laminate, denoted by the numeral 10' in FIG. 9, then passes beneath a cooling belt 54 of stainless steel or other suitable material. This belt is carried by five rollers 55 through 59, with the rollers 56 through 59 being relatively small rollers and the roller 55 being a relatively large cooling roller and over which the belt 54 travels throughout a substantial portion of its periphery. The rollers 56 and 59 are spaced a distance apart and are in pressure engagement with the resultant product 10' to hold the film 42 in tight engagement with the cells 14 until its temperature has been lowered sufficiently to insure a permanent joinder. The completed product is then transported from the apparatus by a suitable conveyor such as the belt 60 carried by rollers 61 and 62.

In the preceding embodiments of the invention the heated films are fed to the molding and laminating roller 15 by means of heated rollers. While rollers provide an effective means for heating and applying the film to the molding roller, in certain cases it is desirable to feed at least one of the films tangentially onto the embossing roller 15 and avoid actual contact of the heated film with roller surfaces. This may be attained by an improved film heating and transporting means as illustrated in FIG. 4 of the drawings. In this figure, the film 11 to be embossed may be heated by means of rollers in substantially the same manner illustrated and described in connection with FIG. 1. After the film has been preheated by rollers 18, 19 and possibly 22 of FIG. 1, the film then enters the area between a pair of manifolds 63 and 64. These manifolds extend throughout the entire length of the embossing or molding roller 15 which is substantially identical to the roller 15 of FIG. 1, and are each provided with a plurality of orifices 63' and 64'. The manifolds are in spaced relationship and include inlets 65 and 66 for the admission of gas under pressure such as air or the like. Inasmuch as it is desirable to supply additional heat to the film 11 in order to raise its temperature to the proper molding temperature as previously described, it is preferable to supply heated air to these manifolds. The pressure on the two manifolds is controlled so that the film will be supported solely by the air emanating from the orifices 63' and 64' and will be guided onto the molding roller 15. The utilization of manifolds enables them to be contoured so that they can be placed in close proximity to the roller 15. In the present form of the invention, the upper manifold 63 may also extend beyond the point of tangency with the roller 15 as indicated in dotted outline and thus continuously apply heat to the film even after contact with the roller 15 and initiation of the molding process. The second film 13 is handled by rollers 29, 30, and 31 which correspond to the rollers of FIG. 1 which bear the same numerals in FIG. 1. After the molding and laminating processes have been completed, the composite material is cooled and is removed from the roller 15 by a so-called stripping roller 32 and the resultant material 10 is then conveyed from the fabricating apparatus.

FIGS. 5 and 6 illustrate a modified procedure for molding and laminating film in accordance with the invention. In this embodiment the film 11 to be molded is preheated by means such as those described in connection with FIGS. 1, 3 and 4 and is then fed on to the embossing roller 15. At the point of contact of the film 11 with the roller 15, it is forced into depressions 67 on the roller 15 as may be observed in FIG. 6 by the pressure roller 68. The pressure roller has a rigid core 69 covered by a resilient material 70 of rubber or the like which functions to mechanically force the film 11 into the depressions 67 on the molding roller 15. At the same time the depressions 67 may be provided with suitable vacuum means 71 which in turn are connected with a vacuum chamber 72 within the roller 15. Thus, the film 11 is mechanically forced into the depressions 67 and then is retained in the depressions by vacuum means.

After the molding operation has been accomplished, the second preheated film 13 is then applied by means of a pressure roller 73 which corresponds to the roller 31 of FIG. 1. The film 13 seals the molded portions of film 11 to form a plurality of individual cells, as illustrated and described in connection with FIG. 8 and the completed and cooled product is removed by the stripping roller 74. The finished product is denoted in these figures by the numeral 10.

FIG. 7 illustrates a modified arrangement of elements for feeding plastic film to be molded and laminated on to the embossing roller 15 and then cooling the laminated structure rapidly in order to facilitate the attainment of higher speeds of operation. The product produced in accordance with this embodiment of the invention is denoted by the numeral 10 and corresponds to the structure generally shown in FIG. 8 of the drawings. It is to be understood, however, that while the cells 14 of FIG. 8 have a generally rectangular configuration, it is evident that they may be provided with any desired contour as, for instance, hexagonal, circular, or even hemispherical.

The film 11 to be molded by the roller 15 is preheated by a series of rollers in substantially the same manner as described in connection with FIG. 1. The pre-heated film is then fed onto the roller 15 by means of a heated roller 76 which raises the film temperature to a point near its melting point as may be required for proper molding of the film. The second film 13 is also pre-heated in the manner illustrated and described in connection with FIG. 1 and is fed in pressure contact with the film 11 to provide a permanently fused laminate.

In this embodiment of the invention the two films 11 and 13 are held in pressure engagement one with the other during the travel about the molding roller 15 by means of an endless belt 77 that may be formed of a silicone coated fabric, silicone film, tetrafluoroethylene film, or other suitable material. The belt 77 is fed about a series of rollers 78, 79, 80 and 81 which are heated in order to impart a relatively high temperature to the belt 77 just prior to the point at which it is fed onto and rides about the roller 15. The film 13, as will be observed, is carried by the belt 77 during a portion of its movement about the roller 81 and is moved into pressure contact with the molded film 11. Thereafter, the two films are held in pressure engagement by that portion of the belt disposed about the roller 15. The belt 77 is guided away from the roller 15 by means of a roller 82 which also serves to strip the resultant material 10 from the roller 15, the material then being transported from the apparatus by suitable conveying means such as the roller 83. After leaving the roller 15, the belt 77 is carried by a series of rollers 84, 85, 86 and 87 which return it to the heating roller 78. In order to insure constant pressure engagement of belt 77 with the roller 15 one or more of the supporting rollers are spring loaded and at least one other roller is driven in order to move the belt in synchronism with the movement of the roller 15.

Inasmuch as the belt 77 is heated, the film 13 will have a constant supply of heat during the time it makes initial contact with the film 11 and for a short distance thereafter, to insure complete fusion with the film 11.

In order to cool the resultant product 10 before removal from the roller 15, cooling means are provided in the form of an endless belt 88, of stainless steel or other suitable material carried by rollers 89, 90, and 91. The rollers 89, 90 and 91 are maintained at a relatively low temperature, preferably about or below room temperature, for the purpose of constantly cooling the belt 88. When the cooled belt 88 moves into pressure contact with the outer surface of the belt 77, heat is withdrawn from the belt 77 and consequently the laminated films 11 and 13, so that by the time the resultant laminated product 10 is stripped from the roller, its temperature has been substantially lowered and permanent fusion of the films is assured.

Under certain conditions it may be desirable to preheat the surface of the molding roller 15 just prior to the application of the film 11 for the molding operation. For this purpose, a suitable preheating plate 92 may be provided and placed in close proximity to the surface of the roller 15 in advance of the roller 76. Preheating of the molding roller 15 may of course be utilized with the embodiments of the invention previously described.

While the molding roller 15 referred to in the embodiments of the invention previously described may take any desired form, a preferred form of roller is shown in FIGS. 10 through 14. This roller may be made in any desired length and affords a number of advantages, including independent control of the vacuum holding means and cooling means, as well as automatic valving for the control of the vacuum to avoid unnecessary loss of vacuum over exposed portions of the roller 15 between the point of application of the film to be molded and the point at which the final product is stripped from the roller.

More specifically, the roller 15 includes a central hollow shaft having threaded inserts 101 secured in the ends thereof for the reception of conduits 102 for the introduction and removal of a cooling liquid such as water. The shaft 100 is rotatably mounted by suitable bearings 103 and may be driven in any desired manner as, for instance, by means of a suitable pulley or gear secured to the shaft 100 for the transmission of power to the roller structure.

The roller in accordance with the invention is fabricated of a number of independent elements secured one to the other in order to reduce fabrication costs and provide an improved and more dependable structure. More specifically, the roller includes a pair of circular elements or hubs generally denoted by the numerals 104 and 105, and of identical construction. Each of these hubs includes a central portion 106 and an outwardly extending flange 107 of appreciable thickness. The flange 107 is set back from the inner edge 108 of the hub to form a flat surface portion 109 and the outer portion of the hub is of reduced thickness to form adjoining bearing surfaces 110 and 111. The flanges 107 each include a plurality of radially disposed passages 112 through which air is exhausted and terminate at their lower ends in axially disposed openings 113 which terminate in the face 111 of the hub. The outer ends of each of the radially disposed passages 112 are closed by suitable plugs 114, though it is apparent that the openings 112 and 113 may be formed in other ways to avoid the need for individual plugs 114. The relative angular positions of the radial passages 112 may be observed more clearly in FIG. 11.

The two hubs 104 and 105 are carried near the ends of the shaft 100 and are each provided with recesses 115 for the reception of O-rings or other suitable gasket material to seal the hubs to the outer surface of the shaft 100. In addition, the shaft may carry suitable stops 116 to determine the innermost position of the hubs 104 and 105. The hubs 104 and 105 are joined together by a bridging member comprising a cylindrical shell 117 of steel or other suitable material and having a pair of rings 118 permanently secured to its ends and extending inwardly thereof. The inner diameter of each of the rings 118 is approximately equal to the diameter of the hub surface 109 and O-rings 119 are provided to form a seal between each hub and its associated ring 118.

Attachment of hubs 104 and 105 to the bridging member including the cylindrical shell 117 and rings 118 is attained by a plurality of bolts 120 which may be observed more clearly in FIG. 11 and extend through the flange portions of the hub 107 and threadably engage the shell 117. The bolts 120 have been illustrated in dotted outline in FIG. 10, as they are disposed between adjoining radial openings 112.

It will be observed from the structure thus far described that a hollow roller has been formed which facilitates the circulation of the cooling medium therethrough. In order to limit the mass of the fluid within the roller, the space 121 is reduced in volume by the insertion of an internal cylindrical structure formed of a cylindrical member 122 and a pair of end members 123. The members 122 and 123 are permanently secured together and are attached to and carried by the shaft 100. Circulation of a coolant through the space 121 is achieved by two sets of openings 124 and 125 formed in the shaft 100 and the associated baffles 126 and 127. With this arrangement the coolant may enter the right hand end of the shaft 100, flow through openings 124, then the space 121, openings 125 and be discharged through conduit 102 at the left end of the shaft 100.

The outer surface of the cylindrical member 117 forming part of the roller 15 carries a cylindrical shell 128 of a material that is preferably a good heat conductor, such as brass or aluminum. The shell 128 includes a plurality of spaced, longitudinally disposed openings or passages 129 that communicate with transverse openings 130 in the flanges 107 in order to connect the passages 129 with the radial passages 112.

Air is withdrawn from the ports 113, previously described, by means of a pair of headers or collector rings 131 and 132 which are identical in construction, but reversed in position. This reversal in position of the headers 131 and 132 is necessitated by the fact that both headers employ means to block vacuum passages during their travel through a predetermined angular portion of roller movement. Since both headers are identical only the header 131 will be described. Header 131 is essentially cylindrical in shape and has an internal diameter that will permit it to be rotatably received by the surface 110 of the hub 104. The header is also provided with a side surface 132 which rides snugly against the surface 111 of the hub. While the header 131 and the hub 104 may be made of any suitable material, it has been found that by utilizing a material such as cast iron for the hub and a material such as bronze for the header, that excellent bearing is obtained with minimum loss of vacuum. The header is secured in position on the roller by a plate or other attaching ring 133 which bears against an outer surface 134 of the header and is secured to the hub by bolts 135. If desired, the shaft 100 may include a reduced section 136, in which case the inside diameter of the ring 133 would be arranged to snugly fit such reduced section and limit the innermost position of the ring.

The vacuum or air passage within hub 131 is in the form of annular slots 137 formed in the surfaces 132 of the hubs. The diameter of the slots 137 is coordinated with the drilled openings 113 so that when the header is in position on the roller as illustrated, the passages 113 will be aligned with the annular slots 137. Conduits 138 are threadably inserted in cooperative openings 139 of the headers and communicate with the annular slots 137. The conduits 138 may be connected to a suitable vacuum pump or equivalent means for extracting air from the molding roller 15.

It was previously pointed out that it is desirable to cut off the vacuum from successive portions of the molding roller 15 as they pass between the point of stripping the finished product from the molding roller and the point at which the film is applied to the roller for the molding operation. This is accomplished by limiting the angular span of the passage 137 in the header, as will be observed more clearly in FIG. 11. In this figure it will be observed that the passage 137 has an angular width of slightly greater than 270° and is in communication with all but four of the vacuum ports 113. These four ports are therefore automatically blocked or closed by the header. Since the headers are fixed relative to the roller 15, it is evident that by properly aligning the position of the headers 131 and 132 relative to the position of the pressure roller 23 and stripping roller 32 as shown in FIG. 1, that as each of the ports 113 move through the angular position between these two rollers, they will be successively blocked by the headers to prevent unnecessary loss of vacuum. It is also apparent that the angular span of the passage 137 can be arranged in any desired manner to coordinate the operation of the headers with the position of the stripping and pressure rollers, as previously described.

The molding roller 15, while being generally useful for the molding and forming of plastic sheet materials, is particularly useful for fabricating cushioning materials such as shown and described in connection with FIGS. 8 and 9 of the drawings. For this purpose, the outer surface of the roller is provided with a molding layer 140 having a plurality of discrete openings or pockets 141 formed therein. In the illustrated form, this layer gives the appearance of a grating, and may be formed of any suitable material having low heat conductivity as, for instance, the silicones, tetrafluoroethylenes, heat resistant rubbers, epoxies, and low heat conductive metals such as alloys of tin and bismuth. While the layer 140 may be secured to the roller in any desired manner, it is preferably fabricated in the form of a cylinder and installed on the roller prior to the attachment of one or both of the hubs 104 and 105. Vacuum is applied to the openings or pockets 141 by serrating the surface of the cylindrical shell 128, as indicated at 142 in FIGS. 12 and 13, and providing spaced vacuum ports 143 connecting the serrated surface with the transverse passages 129, as may be observed in FIGS. 12 and 13. Since the molded surface 140 is carried on top of the serrated surface 142, air can readily flow beneath the molding layer 140 and thus avoids the necessity of having an individual vacuum port 143 communicating with each of the individual openings or recesses 141.

FIG. 14 illustrates the flow of air beneath the molding layer, by reason of the utilization of the serrated surface 142, and it is evident that alternate structures may be employed for this purpose as, for instance, a layer of woven material such as a metal screen or the like, as shown in FIG. 17.

In certain cases it may be desirable to fabricate the molding layer 140 of a material having increased heat conductivity in order to effect more rapid cooling of the molded plastic film. In such an instance it may be desirable to coat the surface of the forming layer with a material such as an epoxy resin and silicone resin, or the like, as indicated at 145 in FIG. 12 in order to insulate the unmolded portions of the film from contact with the outer surface 146 of the molding layer 140. The layer 145 may be either rigid or resilient as may be desired. In this way increased cooling of the formed portions of the film would be obtained, while the unmolded portions, which are to be fused onto a backing film would remain at a reasonably high temperature to insure complete fusion. In cases where rapid cooling is not required, the forming surface 140 may be fabricated of a material having good heat insulating characteristics, in which instance a surface layer of insulating material would not be required. This structure is illustrated in FIG. 18.

A further modification of the molding layer 140 is illustrated in FIGS. 15 and 16, wherein both the serrated surface 142 and the screen 144 are eliminated. In this case the molding layer is provided, as in the previous embodiments of the invention, with a plurality of molding recesses 141 separated by defining walls 148. Each of the walls 148 in this embodiment, however, is provided with a channel 149 formed in the inner surface in order to permit air to flow freely from recess to recess, and thus enable spaced vacuum ports 143 to evacuate all of the recesses 147 to effect the molding operation.

In the form of the invention shown in FIGS. 15 and 16, the molding layer is coated with an insulating resin 150, which corresponds to the layer 145 shown in FIG. 12, and further includes an outer layer 151.

The layer 151 would preferably constitute a thin section of a heat conductive material that could be heated and which would retain the heat for a reasonable period after the completion of the laminating operation, as previously described. The utilization of a conductive layer 151 enables the unformed portions 11' (see FIG. 8) of the molded film 11 to be maintained close to the fusing temperature while selectively cooling the molded product. The layer 151, being of a conductive material, may be readily heated by any suitable source of radiant energy, and particularly high frequency energy that would have a more pronounced effect in selectively heating the layer 151.

The roller 15 previously described, has a significant advantage in that it affords individual control of the vacuum and cooling medium, which greatly simplifies the operation of the equipment and affords a more versatile piece of apparatus. Furthermore, the unique arrangement and coordination of the elements enables the roller to be formed in individual sections which can be readily taken apart for cleaning and/or modifying the molding surface. Thus, if a change in the pattern is required, it is merely necessary to replace the surface layer 140 with another surface layer having modified recesses to effect the desired result.

While only one embodiment of the molding roller has been illustrated and described, it is of course evident that changes can be made in this roller while retaining the numerous advantages such as independent control of the vacuum and cooling mediums, selective control of the vacuum applied to the vacuum conduits and a readily interchangeable molding surface.

It is also understood that only certain forms of the invention have been illustrated and described herein and that changes, modifications and alterations may be made without departing from the true scope and spirit thereof as defined by the appended claims.

What is claimed is:

1. Apparatus for molding and laminating plastic sheet materials comprising a molding roller, means for heating plastic sheet material and feeding it onto said molding roller to form a purality of cell-like embossments, means for heating a second plastic sheet to a fusing temperature and feeding it onto said roller at the fusing temperature in overlying pressure engagement with the first said film to fuse the sheets one to the other to form a unitary structure, means for cooling said resultant structure while on said molding roller to set the seal, means for removing the cooled completed structure from said molding roller, said molding roller comprising a hollow shaft, a pair of hubs secured to and carried by said shaft, a cylindrical element disposed between said hubs and in spaced relationship to said shaft to form a chamber therebetween, means including openings in said shaft for circulating a fluid through said shaft and chamber a cylindrical member having spaced passages extending therethrough in parallel relationship one to the others and to the axis of said members, the last said cylindrical member being secured to and overlying said cylindrical element, said hubs each including a plurality of passages each communicating with a passage in said cylindrical member and terminating on an outer face of said hub, ring members carried by each of said hubs for rotation relative to said hubs, each ring member having an annular passage therein in communication with said hub passages, a molding surface carried by said cylindrical member and including a plurality of recesses, and means interconnecting each of said recesses with at least one of said passages in said cylindrical member.

2. Apparatus for molding and laminating plastic sheet materials comprising a molding roller, means for heating plastic sheet material and feeding it onto said molding roller to form a plurality of cell-like embossments, means for heating a second plastic sheet to a fusing temperature and feeding it onto said roller at the fusing temperature in overlying pressure engagement with the first said film to fuse the sheets one to the other to form a unitary structure, means for cooling said resultant structure while on said molding roller to set the seal, means for removing the cooled completed structure from said molding roller, said molding roller comprising a hollow cylindrical shell and plates closing the ends of said shell and having a central shaft receiving opening therein, shaft means engaging said opening for rotatably supporting said shell, said shell having a plurality of discrete recesses formed in the surface thereof and a plurality of spaced passages in substantially parallel relationship to the roller shaft, means on at least one end of the roller and communicating with said passages for withdrawal of air therefrom, vacuum ports in the bottom of each of said recesses and communicating with said passages, and means on said shaft for circulating a coolant through said shell to maintain the surface at a predetermined temperature.

3. In apparatus according to claim 2 wherein said means on at least one end of said roller comprises valving means for applying vacuum to each passage as it moves through a predetermined angle of less than 360° and for removing vacuum from said passage as it moves through the reflex angle to complete one revolution.

4. In apparatus for molding and laminating plastic sheet materials according to claim 2 wherein at least one of said heating and feeding means comprises a pair of gas manifolds positioned in overlying relationship, the adjoining faces of said manifolds each having a plurality of orifices therein, means for feeding said film between said manifolds and onto said molding roller, and means for supplying heated gas under pressure to said manifolds, said heated gas being discharged through said orifices to physically support said film during its passage between said manifolds and impart heat thereto.

5. Apparatus for molding and laminating plastic sheet materials according to claim 2 wherein said means for cooling said resultant structure comprises a water spray.

6. Apparatus for molding and laminating plastic sheet materials according to claim 2 wherein said means for cooling said resultant structure comprises a cooling belt movable in pressure engagement with said sealed films while on said molding roller.

References Cited by the Examiner

UNITED STATES PATENTS

| | | | |
|---|---|---|---|
| 2,193,750 | 3/40 | Welker et al. | 154—45 |
| 2,218,227 | 10/40 | Winnek | 154—106 XR |
| 2,429,482 | 10/47 | Muntes | 154—30 |
| 2,480,316 | 8/49 | Blair et al. | 154—33.05 |
| 2,503,164 | 4/50 | McGuire | 154—49.2 |
| 2,633,442 | 3/53 | Caldwell | 154—146 |
| 2,660,757 | 12/53 | Smith et al. | 154—106 |
| 2,670,501 | 3/54 | Michiels | 154—110 |
| 2,759,866 | 8/56 | Seymour | 154—102 |
| 2,771,388 | 11/56 | Rocky et al. | 154—102 |
| 2,776,452 | 1/57 | Chavannes | 18—10 |
| 2,793,677 | 5/57 | Armstrong | 154—37 |
| 2,905,969 | 9/59 | Gilbert | 18—19 |
| 3,026,231 | 3/62 | Chavannes | 156—205 |

FOREIGN PATENTS 160,551   1/55   Australia.

EARL M. BERGERT, *Primary Examiner.*

CARL F. KRAFFT, *Examiner.*